G. A. INMAN.
PROTECTOR PLATE.
APPLICATION FILED MAR. 16, 1914.
1,119,082.
Patented Dec. 1, 1914.
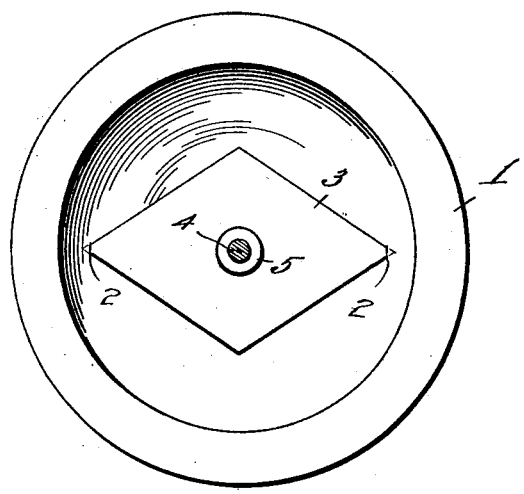
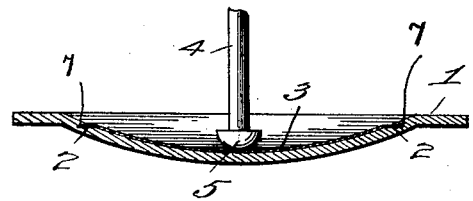
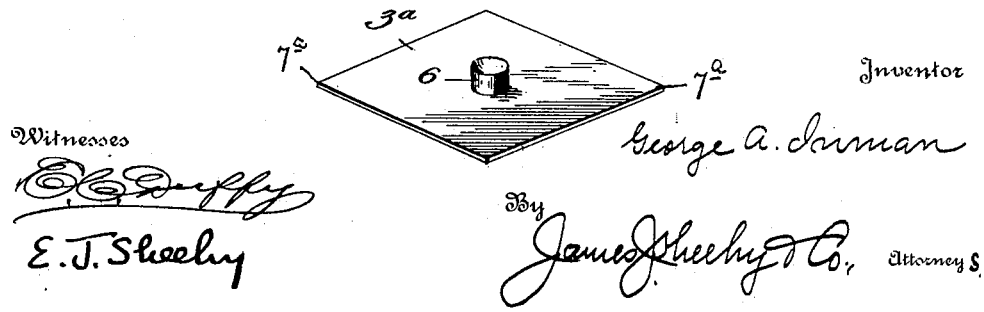

UNITED STATES PATENT OFFICE.

GEORGE A. INMAN, OF PROVIDENCE, RHODE ISLAND.

PROTECTOR-PLATE.

1,119,082.      Specification of Letters Patent.      Patented Dec. 1, 1914.

Application filed March 16, 1914. Serial No. 825,017.

*To all whom it may concern:*

Be it known that I, GEORGE A. INMAN, citizen of the United States, residing at Providence, in the county of Providence and State of Rhode Island, have invented new and useful Improvements in Protector-Plates, of which the following is a specification.

My invention pertains to protector plates for rubber diaphragms, and it contemplates the provision of a metal plate that will prevent wear of the rubber by the constant action of the piston against the central portion thereof, which constant action causes the rubber to become worn, vacuum lost and the steam to enter all around the diaphragm, thereby rendering the same unfit for use and necessitating the substitution of a new diaphragm.

Other advantageous features of my device will be readily appreciated from the following description and claims when the same are read in connection with the drawings, accompanying and forming part of this specification, in which:

Figure 1 is a plan view of my novel protector plate as applied to a diaphragm, showing the mode of attaching the plate thereto, and also showing the plunger head resting on the central portion of the protector plate. Fig. 2 is a transverse section of the same, but showing the plunger and plunger head in elevation. Fig. 3 is a modification of a construction of my novel protector plate, showing a reinforcing boss in the central portion of the protector plate, which boss tends to strengthen the plate and thereby give to the diaphragm rubber a double reinforcement.

Similar numerals of reference designate corresponding parts in Figs. 1 and 2 of the drawings.

1 represents a diaphragm of the ordinary well known construction, formed of rubber or other suitable material, and at 2 I have shown apertures or pockets for the reception of the protector plate 3. The said protector plate 3 may be of any configuration, but I prefer it to be of diamond-shape and formed of a material that is tough and well able to withstand the constant action of the plunger 4 and plunger head 5, but still be possessed of sufficient resiliency so as to give to a slight degree and thereby prevent retarding of the backward and forward movement of the plunger and plunger head.

As will be readily seen by reference to the drawings, the points 7 of the protector plate 3 will take into the apertures or pockets 2, thereby retaining the protector plate in proper relation to the diaphragm rubber, so as to prevent the same from sliding around when the plunger is in action.

In Fig. 3, I have shown a modification of the protector plate which consists in the plate $3^a$ having a boss 6 formed therein, which boss tends to reinforce the plate $3^a$ thereby practically making the diaphragm doubly reinforced at the point where the plunger head strikes the protector plate. As is the case with the protector plate shown in Figs. 1 and 2, the modified form also shows the points $7^a$ which will enter the apertures or pockets 2 when the modified form is used in lieu of the preferred embodiment.

It will be gathered from the foregoing that my novel protector plate is inexpensive to produce, easy to apply, and will serve to materially strengthen a diaphragm plate, and thereby prolong the life of the same for an indefinite period, and will in no way retard the action of the plunger upon the diaphragm.

Having described my invention, what I claim and desire to secure by Letters-Patent, is:

1. As a new article of manufacture, a diaphragm formed of suitable material and provided with pockets for the reception of a reinforcing plate.

2. As a new article of manufacture, a diaphragm formed of suitable material and provided with apertures for the reception of a plate, said plate being reinforced at its central point with a boss that is formed in said plate.

In testimony whereof I have hereunto set my hand in presence of two subscribing witnesses.

GEORGE A. INMAN.

Witnesses:
CLARA E. WATERMAN,
GRACE A. GARDINER.